United States Patent
Liu et al.

(10) Patent No.: US 8,380,488 B1
(45) Date of Patent: Feb. 19, 2013

(54) IDENTIFYING A PROPERTY OF A DOCUMENT

(75) Inventors: Xin Liu, San Jose, CA (US); Stewart Yang, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 1436 days.

(21) Appl. No.: 11/737,603

(22) Filed: Apr. 19, 2007

Related U.S. Application Data

(60) Provisional application No. 60/793,708, filed on Apr. 19, 2006.

(51) Int. Cl.
G06F 17/28 (2006.01)

(52) U.S. Cl. ............ 704/4; 704/7; 704/8; 704/9; 704/10

(58) Field of Classification Search ................ 704/4–10
See application file for complete search history.

(56) References Cited

U.S. PATENT DOCUMENTS

| | | | |
|---|---|---|---|
| 4,965,763 A | 10/1990 | Zamora | |
| 5,265,065 A | 11/1993 | Turtle | |
| 5,418,948 A | 5/1995 | Turtle | |
| 5,664,027 A | 9/1997 | Ittner | |
| 5,689,616 A | 11/1997 | Li | |
| 5,717,913 A | 2/1998 | Driscoll | |
| 5,835,912 A | 11/1998 | Pet | |
| 5,956,711 A | 9/1999 | Sullivan et al. | |
| 6,006,221 A | 12/1999 | Liddy et al. | |
| 6,076,088 A | 6/2000 | Paik et al. | |
| 6,078,914 A | 6/2000 | Redfern | |
| 6,092,038 A * | 7/2000 | Kanevsky et al. | 704/9 |
| 6,167,369 A | 12/2000 | Schulze | |
| 6,263,335 B1 | 7/2001 | Paik et al. | |
| 6,272,456 B1 | 8/2001 | de Campos | |
| 6,292,772 B1 | 9/2001 | Kantrowitz | |
| 6,415,250 B1 | 7/2002 | van den Akker | |
| 6,519,585 B1 | 2/2003 | Kohli | |
| 6,546,365 B1 | 4/2003 | Gajda et al. | |
| 6,546,388 B1 | 4/2003 | Edlund et al. | |
| 6,615,168 B1 | 9/2003 | Resnik et al. | |
| 6,715,130 B1 | 3/2004 | Eiche et al. | |
| 6,999,932 B1 | 2/2006 | Zhou | |
| 7,054,803 B2 | 5/2006 | Eisele | |
| 7,103,532 B1 | 9/2006 | Murray et al. | |

(Continued)

FOREIGN PATENT DOCUMENTS

WO  WO 02/31814 A1  4/2002

OTHER PUBLICATIONS

Chinese Office Action for Application No. 200780021902.1; dated Jun. 24, 2010, 12 pages.

(Continued)

*Primary Examiner* — Leonard Saint Cyr
(74) *Attorney, Agent, or Firm* — Fish & Richardson P.C.

(57) ABSTRACT

Methods, systems and apparatus, including computer program products, for identifying properties of an electronic document. In one aspect, a sequence of bytes representing text in a document is received. A plurality of byte-n-grams are identified from the bytes. For multiple encodings, a respective likelihood of each byte-n-gram occurring in each of the respective multiple encodings is identified. A respective encoding score for each of the multiple encodings is determined. A most likely encoding of the document is identified based on a highest encoding score among the encoding scores. In another aspect, a sequence of characters, having an encoding, are identified in a document. The sequence is segmented into features, each corresponding to two or more characters. A respective score for each of multiple languages is determined based on the features and a respective language model. A language of the document is identified based on the scores.

15 Claims, 2 Drawing Sheets

U.S. PATENT DOCUMENTS

| | | | |
|---|---|---|---|
| 7,120,869 B2 | 10/2006 | Birder | |
| 7,191,116 B2 | 3/2007 | Alpha | |
| 7,277,846 B2 | 10/2007 | Satoh | |
| 7,386,438 B1* | 6/2008 | Franz et al. | 704/8 |
| 7,451,129 B2 | 11/2008 | Lamping et al. | |
| 7,475,063 B2 | 1/2009 | Datta et al. | |
| 7,478,033 B2 | 1/2009 | Wu | |
| 7,599,916 B2 | 10/2009 | Weare | |
| 7,716,049 B2 | 5/2010 | Tian | |
| 7,836,051 B1 | 11/2010 | Mason | |
| 7,895,193 B2 | 2/2011 | Cucerzan | |
| 7,912,907 B1* | 3/2011 | Mantel et al. | 709/206 |
| 7,996,208 B2 | 8/2011 | Elbaz et al. | |
| 2001/0047261 A1 | 11/2001 | Kassan | |
| 2002/0052871 A1 | 5/2002 | Chang et al. | |
| 2002/0059069 A1 | 5/2002 | Hsu et al. | |
| 2002/0091661 A1 | 7/2002 | Anick et al. | |
| 2002/0145742 A1 | 10/2002 | Koenig et al. | |
| 2002/0161733 A1 | 10/2002 | Grainger | |
| 2003/0018468 A1 | 1/2003 | Johnson et al. | |
| 2003/0037136 A1 | 2/2003 | Labovitz et al. | |
| 2003/0097252 A1 | 5/2003 | Mackie | |
| 2003/0149686 A1 | 8/2003 | Drissi et al. | |
| 2003/0149687 A1 | 8/2003 | Brown et al. | |
| 2003/0217052 A1 | 11/2003 | Rubenczyk | |
| 2004/0044950 A1 | 3/2004 | Mills et al. | |
| 2004/0064447 A1 | 4/2004 | Simske et al. | |
| 2004/0133418 A1 | 7/2004 | Turcato et al. | |
| 2004/0153435 A1 | 8/2004 | Gudbjartsson et al. | |
| 2004/0261021 A1 | 12/2004 | Mittal et al. | |
| 2004/0264479 A1 | 12/2004 | Raghunandan | |
| 2005/0065774 A1 | 3/2005 | Doganata et al. | |
| 2005/0108200 A1 | 5/2005 | Meik et al. | |
| 2005/0154578 A1 | 7/2005 | Tong et al. | |
| 2005/0177358 A1 | 8/2005 | Melomed et al. | |
| 2005/0216253 A1 | 9/2005 | Brockett | |
| 2006/0025988 A1* | 2/2006 | Xu et al. | 704/8 |
| 2006/0031207 A1 | 2/2006 | Bjarnestam et al. | |
| 2006/0112091 A1 | 5/2006 | Chapman et al. | |
| 2006/0161543 A1 | 7/2006 | Feng et al. | |
| 2006/0195461 A1 | 8/2006 | Lo et al. | |
| 2006/0277189 A1 | 12/2006 | Cencini | |
| 2006/0293874 A1 | 12/2006 | Zhang et al. | |
| 2007/0016476 A1 | 1/2007 | Hoffberg et al. | |
| 2007/0129935 A1 | 6/2007 | Uchimoto et al. | |
| 2007/0219933 A1 | 9/2007 | Datig | |
| 2007/0244866 A1 | 10/2007 | Mishkanian et al. | |
| 2007/0288230 A1 | 12/2007 | Datta et al. | |
| 2007/0288448 A1 | 12/2007 | Datta | |
| 2007/0288449 A1 | 12/2007 | Datta et al. | |
| 2007/0288450 A1 | 12/2007 | Datta et al. | |
| 2008/0059153 A1 | 3/2008 | Bennett | |
| 2008/0175373 A1 | 7/2008 | Naick et al. | |
| 2012/0109978 A1 | 5/2012 | Datta | |

OTHER PUBLICATIONS

Bashir Ahmed et al., "Language Identification from Text Using N-gram Based Cumulative Frequency Addition", Proceeding of Student/Faculty Research Day, CSIS, Pace University, May 7, 2004, 8 pages.

Supplementary European Search Report for Application No. EP 07 76 095, dated Jul. 8, 2011, 6 pages.

Berger, "Activation on the Move: Adaptive Information Retrieval via Spreading Activation," dated Jul. 8, 2003, 105 pages.

Chinese Office Action for Application No. 200780021902.1; dated Mar. 4, 2010; 3 pages.

Gong, "Semantic Documents for Web Ontology Building," Mar. 14, 2005, 50 pages.

International Preliminary Report on Patentability for PCT International Application No. PCT/US2007/067014; dated Oct. 22, 2008; 9 pages.

International Search Report and Written Opinion of the International Searching Authority, PCT Application No. PCT/US2007/67014, Jun. 23, 2008, 12 pp.

Kapetanios et al., "Multi-lingual Web Querying: A Parametric Linguistics Based Approach," Apr. 19, 2006, 12 pages.

O'Hara, "Empirical Acquisition of Conceptual Distinctions via Dictionary Definitions," dated Aug. 31, 2005, 175 pages.

Step Two Designs Pty Ltd, "Deploying an effective search engine," 2001, p. 6.

Chinese Office Action for Application No. 2012042300743440, dated Apr. 26, 2012, 4 pages.

* cited by examiner

IDENTIFYING A PROPERTY OF A DOCUMENT

CROSS-REFERENCE TO RELATED APPLICATIONS

This application claims the benefit under 35 U.S.C. §119(e) of U.S. Patent Application No. 60/793,708, titled "Identifying a Property of a Document," filed Apr. 19, 2006, which is incorporated here by reference.

BACKGROUND

This specification relates to digital data processing, and more particularly to identifying a property of an electronic document, such as the language in which the document is written or the encoding used for the text of the document.

Given an electronic document containing encoded text, which typically is stored or transmitted as a sequence of raw bytes, it is useful to identify which encoding was used for the text, as well as in which language the text is written. These two problems typically are known as encoding detection and language detection.

Encoding detection and language detection are closely related to each other. On one hand, a language can usually be encoded in several different encodings; for example, Japanese can be encoded in EUC-JP, SHIFT-JIS, JIS, and UTF8. On the other hand, most encodings can encode more than one language. For example, CP1251 can encode Russian, Ukrainian, Bulgarian, and Macedonian. As a result, it typically is difficult to recognize either the language or the encoding alone from a piece of text. In language detection, for example, the same language being encoded in different encodings will result in vastly different byte patterns.

One conventional solution to language detection is to associate language with encodings and create one class for each unique pair. For example, Chinese in GB and Chinese in UTF8 are treated as being from two different classes and are recognized by two different models. This approach leads to a large number of distinct classes for language detection.

SUMMARY

In general, one aspect of the subject matter described in this specification can be embodied in methods that include the actions of receiving a sequence of bytes representing text in a document. A plurality of byte n-grams that occur in the plurality of bytes are identified. Each byte n-gram comprises n adjacent bytes from the sequence of bytes where n is an integer greater than 1. For multiple encodings, a respective likelihood of each byte n-gram occurring in each of the respective multiple encodings is identified. A respective encoding score is determined for each of the multiple encodings. Each respective encoding score is based on the likelihood of the plurality of byte n-grams occurring in the corresponding one of the multiple encodings. A most likely encoding of the document is identified based on a highest encoding score among the encoding scores. Other embodiments of this aspect include corresponding systems, apparatus, and computer program products.

These and other embodiments can optionally include one or more of the following features. The value of n can be two. Every byte n-gram in which all bytes have a value less than 127 can be removed from the plurality of byte n-grams. The document can be received from a web site in a top-level-domain. Multiple likelihoods associated with the top-level-domain can be received where each of the multiple likelihoods can indicate a likelihood that documents from the top-level-domain are in a respective one of the multiple encodings. The encoding score of each of the multiple encodings is determined based on the multiple likelihoods. A language can be identified based on the most likely encoding of the document. A plurality of words, represented in the sequence of bytes representing text in the document, can be identified. A language score for each of multiple languages can be determined based on a respective per-word likelihood that each word occurs in each of the multiple languages. A most likely language of the document can be identified based on a highest language score among the language scores for the multiple languages.

Another aspect of the subject matter described in this specification can be embodied in methods that include the actions of identifying a sequence of characters in a document, the sequence of characters having an encoding. The sequence of characters are segmented into a plurality of features, each feature corresponding to two or more characters. A respective score for each of multiple languages is determined. Each score is based on the plurality of features and a respective language model. The language model associates a probability with each of the features in the corresponding language. A language of the document is identified based on a highest score among the scores for the multiple languages. Other embodiments of this aspect include corresponding systems, apparatus, and computer program products.

These and other embodiments can optionally include one or more of the following features. Segmenting the sequence of characters into a plurality of features can include identifying two or more leading or two or more trailing characters of a word as a feature. Segmenting the sequence of characters into a plurality of features can include segmenting each word in the text of the document into multiple overlapping sequences of three or more characters; and identifying each sequence of three or more characters as a feature. The encoding can be associated with particular natural languages. The particular natural languages associated with the encoding can be selected as the multiple languages. The language model can be generated using a training corpus of documents, each document having an associated language. Each language can be associated with a respective plurality of characters used in writing the language. Generating the language model can include, for each document in the training corpus, segmenting sequences of characters in the document into a plurality of model features; and removing from the plurality of model features every model feature comprising characters not among the plurality of characters used in writing the language of the document. A respective most likely language can be determined for each of two or more windows of n consecutive features in the plurality of features. Several languages occurring in the document can be identified based on the most likely languages determined for all of the two or more windows of n consecutive features. The value of n can be 11. A respective most likely language can be determined for each window of n consecutive features in the plurality of features. The sequence of characters, having a particular encoding, can be converted into a universal encoding. The universal encoding can be Unicode. The document can be received from a web site in a top-level-domain. Multiple likelihoods associated with the top-level-domain can be received. Each of the multiple likelihoods can indicate a likelihood that documents from the top-level-domain are in a respective one of the multiple languages. The encoding score of each of the multiple languages can be determined based on the multiple likelihoods.

Particular embodiments of the subject matter described in this specification can be implemented to realize one or more of the following advantages. Natural-language words are identified as features instead of ambiguous-byte n-grams. Instead of using several classes for a single language, there is only one class for each language. This allows more training data to be used for each class and leads to a smaller memory requirement for an entire trained model. Because individual characters and words are identifiable, multiple languages can be identified in the text, instead of assuming that the all of the text of a single document is from a single language.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how to determine the encoding used for text in an electronic document and the language in which the text is written. The encoding and the language can be determined separately or jointly.

Figure 1:
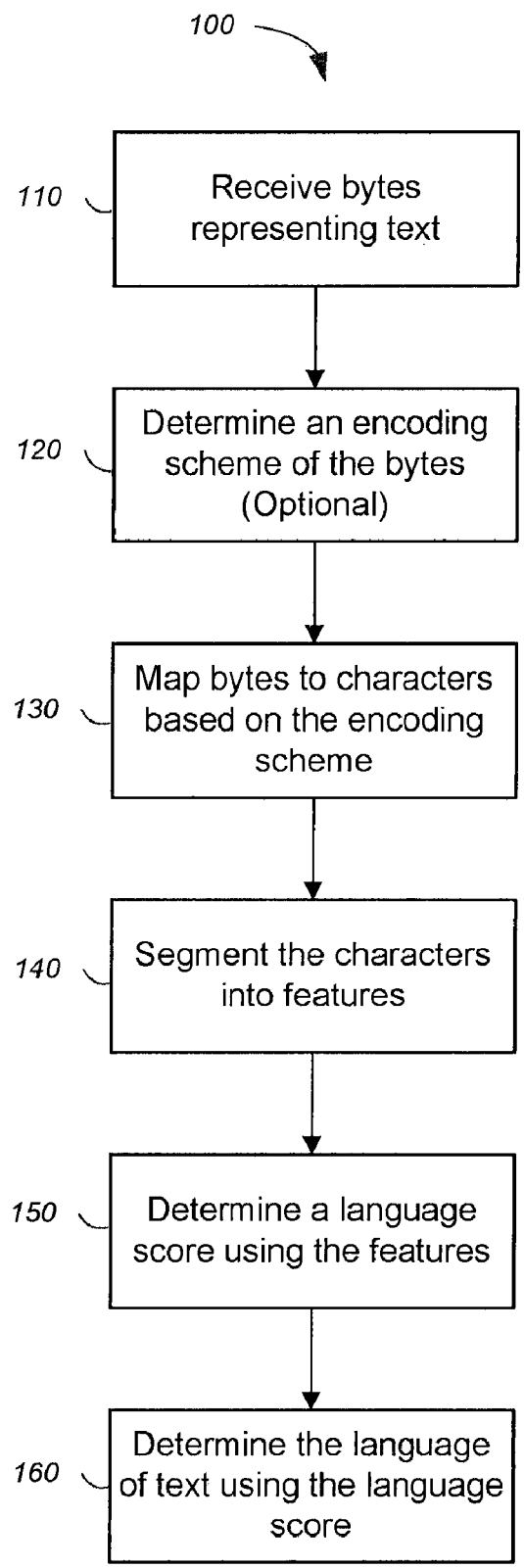
FIG. 1 is a flow diagram of a technique for identifying a language of text.

As shown in FIG. 1, a process 100 includes receiving bytes representing characters of an electronic document (step 110). The process 100 uses statistical learning theories. Specifically, it uses Naïve Bayes classification models to calculate the likelihoods of possible classes and then predicts the class having the maximum likelihood. A class typically is a language/encoding pair that a document can be expressed in; for example, English/ASCII, Japanese/Shift-JIS, or Russian/UTF8. Some languages correspond to multiple classes since they can be encoded in multiple encodings, while some encodings correspond to multiple classes since they can be used to express multiple languages.

The Naïve Bayes model is used to determine the most likely class or classes of a page of text based on the text and (optionally) a URL of the page of text. The class of a page of text can be determined from conditional probabilities by calculating the following, where "*" indicates multiplication, "|" indicates division, and "∝" indicates proportionality:

argmax(class) P(class|url,text)
=argmax(class) P(class, url, text)/P(url, text)
∝ P(url)*P(class|url)*P(text|class, url) (using the chain rule)
∝ P(class|url)*P(text|class) (assuming conditional independency)

The first value of the final line is a conditional probability given by a top-level-domain (TLD) model and the second value is a conditional probability given by a text model. A top-level-domain is the last part of an Internet domain name—the letters that follow the final dot of a URL (e.g., .com or .de). The process 100 optionally includes determining the encoding of the bytes received (step 120).

Encoding detection will be discussed first. In encoding detection, each encoding can form its own class, or language/encoding pairs can form classes. The text model used to determine P(text|class) for encoding detection works as follows. An input text buffer optionally is tested to determine whether it is raw text. If the text is not raw text, it optionally is converted into raw text (e.g., by stripping out certain HTML tags). For each escaped encoding (e.g., ISO-2022-JP), the input text buffer is tested to determine whether it belongs to the escaped encoding by detecting discriminative sequence patterns from the escaped encoding. If the input text buffer belongs to the escaped encoding, the escaped encoding is returned. If the input text buffer does not belong to the escaped encoding, the escaped encoding is pruned from the candidate encoding list.

Figure 2:
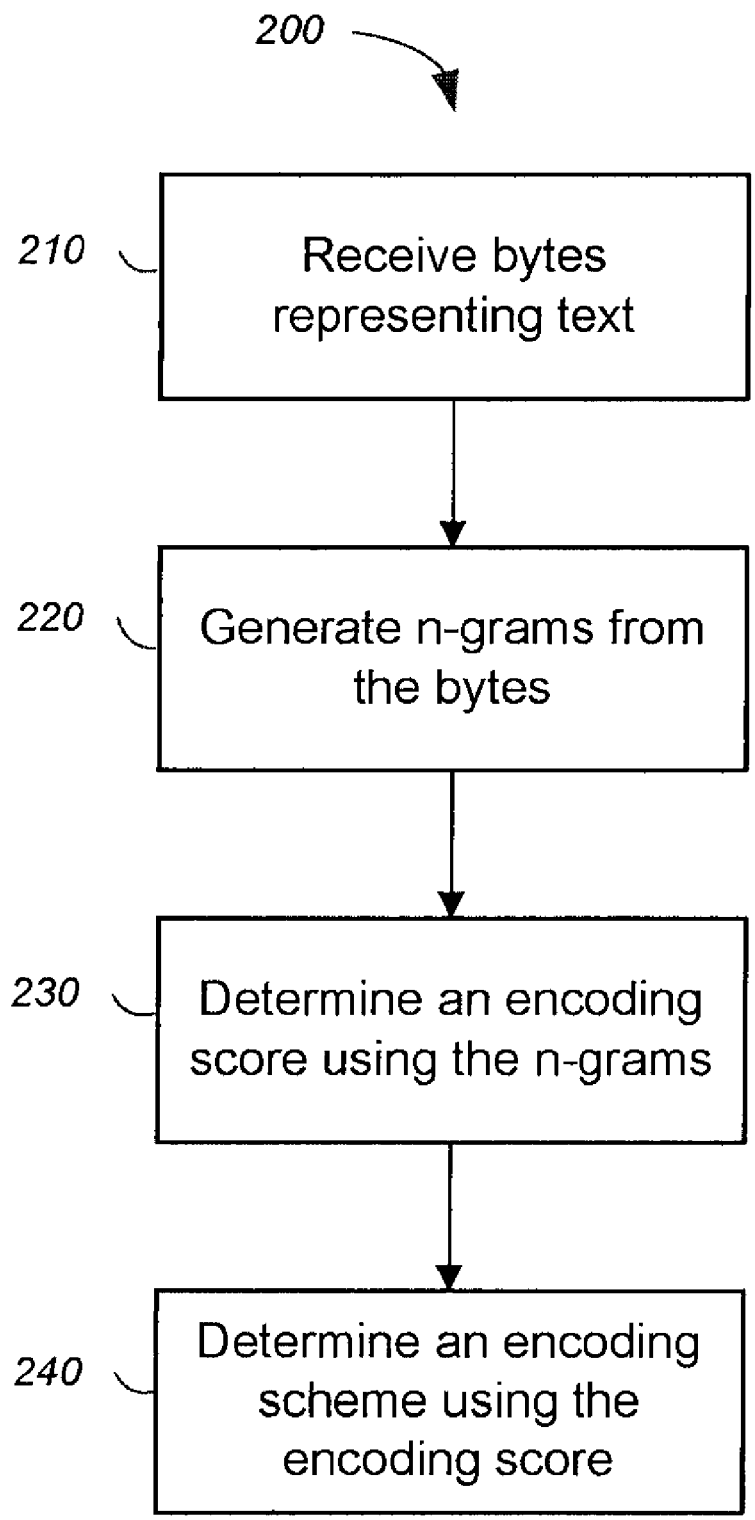
FIG. 2 is a flow diagram of a technique for identifying an encoding of text.

As shown in FIG. 2, bytes representing text are received (step 210). The input text buffer is tested to determine whether it contains any 8-bit characters (i.e., bytes with values above 127). If it does not, ASCII_7BIT encoding is returned. The input text buffer is tested to determine whether the buffer is likely to be a valid 8-bit encoding by looking at the scattering pattern of 8-bit characters. If the text is not likely to be a valid 8-bit encoding, all 8-bit encodings are pruned from the encoding candidate list. The input text buffer is tested to determine whether it is in UTF8. If it is, UTF8 is returned. If it is not, UTF8 is pruned from the candidate encoding list. The input text buffer is tested to determine whether it conforms to any 8-bit Chinese, Japanese, Korean (CJK) encoding. If no CJK encoding is possible, all CJK encodings are pruned from the candidate list. If a CJK encoding is possible, all CJK encodings are kept in the potential encoding pool to increase recall.

A byte-n-gram model, and specifically a byte-bigram model, is used to determine P(text|class). To accomplish this, the bytes are decomposed into a set of byte-bigrams (step 220), the byte-bigram model is initialized with the candidate encoding list, and priors are set using the TLD model (discussed below). An n-gram is a sub-sequence of n items from a given sequence, so a byte-bigram is a pair of adjacent bytes. For each byte-bigram, the model looks up the joint probabilities for all possible classes. Probabilities of all byte-bigrams are multiplied separately (by class) to determine an encoding score (step 230), which represents a likelihood of a particular class, as given by P(text|class). The model can be described by the following formula:

$$P(\text{text}|\text{class}) = P(b1,b2|\text{class}) * P(b2,b3|\text{class}) * P(b3,b4|\text{class}) \ldots$$

The joint probability P(b1, b2) for a given class is estimated from training data by dividing the number of occurrences of that bigram by the total number of observed bigram occurrences in the training data for that class. The detection process checks whether detection is reliable (e.g., by comparing an average per-bigram likelihood to a threshold), and returns the detection result and its reliability.

A pre-filtering is applied on byte-bigram features to better accommodate 8-bit encodings. As a result, the remaining features take one of the following forms:

(8-bit)(8-bit)
(printable 7-bit)(8-bit)
(8-bit)(printable 7-bit)

A byte is 7-bit if its value is less than 128 and is 8-bit otherwise. Byte-bigrams with two 7-bit bytes can be removed, because they are common in all documents and typically carry little discriminative power. Features of (printable 7-bit)(8-bit) and (8-bit)(printable 7-bit) typically are retained because they are frequently used in encodings such as BIG5.

The TLD model used to determine P(class|url) works as follows. The TLD model provides the encoding priors P(enc|url), language priors P(lang|url), and encoding/language priors P(enc, lang|url) given a TLD (e.g., extracted from the URL). P(enc|url) and P(lang|url) are estimated from training data by dividing the number of occurrences for each language/encoding with a given TLD by the number of occurrences for that TLD. To simplify calculations, encoding and language can be treated as being independently distributed. Then P(enc,lang|url), which is equal to P(class|url) when the classes are formed from language/encoding pairs, is obtained by P(enc|url)*P(lang|url).

In one implementation, the encoding detection returns the single most likely encoding and its corresponding information based on the encoding with the highest encoding score (step 240). In an alternative implementation, the encoding detection returns all possible encodings ranked by their likelihoods. HTTP header information, and specifically the encoding tag in the header (if present), can be used to correct the resulting encoding.

Returning to FIG. 1, language detection will now be discussed. The received bytes are converted from the original encoding (e.g., the encoding that was detected above) into Unicode characters (step 130) when performing language detection.

Language detection is performed using features, which are derived by segmenting the characters into features (step 140). Typically, natural language words are the best features to use, so the text is segmented into words. For languages like Chinese, Japanese, Korean, and That, however, the segmentation of text into words is not straightforward. As a result, individual characters are used as features for languages such as these.

The basic logic of the text segmenter, presented in pseudocode, is:

if the next character c is from spaced languages {
        append it to the word buffer
    } else if c is from unspaced languages {
        if the current word buffer is not empty, append it to the
            feature list;
        append c to the feature list;
    } else {//delimiter in this case
        if the current word buffer is not empty, append it to the
            feature list;
    }

Languages such as Chinese, Japanese, Korean, and That are called unspaced languages, and other languages are called spaced languages, because there are spaces between words. The procedure recognizes a character as being from a spaced or an unspaced language using knowledge of Unicode. In addition, numbers can be treated as delimiters and thus be precluded from constructed features. ASCII punctuation characters can be treated as delimiters, and some Asian punctuation characters can be recognized as unspaced language characters because they are potentially instrumental. Words from spaced languages can be limited to 2-8 characters as a means of word normalization. Words can be converted to lower case.

Language models built during training (discussed below) are used to perform language detection. When a piece of text, its encoding, and (optionally) its URL are input to the language detection process, the text is converted into Unicode and segmented to construct a feature vector, as described above. The Naïve Bayes algorithm then is used to conduct language detection by using the features to determine a language score (step 150). Features are scored based on the likelihood of the feature being in a particular language. The language of the text is determined using the language scores of features in the text (step 160). In one implementation, the detected language of a text is the language most frequently detected among features of the text. The Naïve Bayes model is used, in part, because of its good balance of simplicity, speed, and accuracy. Other models (e.g., a linear support vector machine classifier) can be used in a similar manner.

A bag-of-words model is used to determine P(text|class). It differs from the byte-bigram model described above in that it models probabilities of individual words rather than those of byte-bigrams. The feature space is limited by taking either the leading or tailing n (e.g., 8) characters of each word and use those letters as a token. The vocabulary of the model also can be limited (e.g., to 10,000 words for each class). If an encountered token is not in the vocabulary, it is skipped. The words used in the vocabulary can be selected at training time to be those that appear in the most documents.

Because the encoding of the input text is known, as well as which languages this encoding can encode, the detection can be constrained to be conducted only on those languages. For example, if the input text is encoded in KOI8R, then the text is in Russian, Bulgarian, Ukrainian, or Macedonian. Thus, the detection only needs to be done on these four languages. If the text is in an encoding that encodes only one language, for example GB for Chinese, then that language can be returned directly without having to do any detection.

Out-of-vocabulary (OOV) words can be weighted using one of two approaches. The first approach is to calculate one OOV probability for each language based on its training data. The second approach is to calculate a global OOV probability for all languages. When the OOV probabilities of all languages are set to a single value, no language is favored.

Some electronic documents include two or more languages. For example, a document can contain half English and half Chinese content. Labeling the document as being either in Chinese or in English will cause the other half to be lost. In one embodiment, multiple languages are detected in a single document along with the percentage of the document that is in the respective language. Mixture language detection is performed using a sliding window approach. Given a window size of n (e.g., n=11), each n consecutive features of the text are considered, and one language is predicted for those features. After processing the text, a histogram of language occurrence counts is obtained. The languages with the top N occurrence counts are taken, and the counts are normalized into percentages. Languages with very small occurrence counts can be disregarded as noise.

The size of the sliding window (n) plays an important role in the detection. A large n will smooth out language differences, while making the detection on each window more reliable because of more features. A small n will generate finer-granularity detection results, while making each detection less reliable. In the extreme, if n is set to infinity, then mixture language detection is the same as the original (single) language detection.

The Naïve Bayes model can be trained and tested using a large sample of electronic documents in various known languages. The sample is divided into a training set (e.g., 60% of the sample) and a testing set (e.g., 40% of the sample). Training the model is essentially calculating P(feature|language). Because P(feature|language A) is independent of P(feature|language B) for any two languages A and B, the probabilities are calculated one language at a time and can be output to a single file. A user can configure the process to load data only for the languages that the user is interested in. Also, adding support for another language is as easy as generating a model file and adding its address to an index of model files. A similar training method can be used for encodings.

One language is trained at a time using as input pieces of text or feature-frequency pairs. A model is output at the end of the training A maximum number of vocabularies to include in the resulting model file can be set.

A text buffer in any native encoding is segmented into features and the occurrence counts of these features are updated. The features are sorted according to their occurrences, and the most-frequently occurring words are considered. The probabilities of the most-frequently occurring words are output to a string, which is written to a file. Feature weights are calculated from occurrence counts.

Because each feature is composed of a few Unicode code points, and because each language is known to be based on a certain range or ranges of code points, features of a language can be constrained to be within a certain range or ranges. For example, because Greek is encoded in Unicode using code points {0x370, 0x3FF} and {0x1F00, 0x1FFF}, features that consist of one or more characters outside of these two ranges can be filtered out when building the model for Greek. The models built by excluding ranges in this way can be quite different from models built without excluding ranges. For example, many English words, e.g. "www" and "email," appear in models of non-English languages with high probabilities and are removed when ranges are excluded.

A model can be trained initially on a small number of specially-selected human-labeled repository pages. The initial model is run on a larger set of pages, and the detection results are used to guide the training of a new model. The new model typically is more reliable than the initial model because the new model is trained on a less noisy and much larger set of pages. New models can be trained iteratively in this way. Training new models in this way also updates the models to include new words in each language that were not present in the repository pages.

In one implementation, instead of using individual words as features, trigrams of words are used as features. Taking the word "Google", for example, instead of making one feature out of the entire word, each three consecutive characters "Goo", "oog", "ogl", and "gle" are treated as features. Words that have exactly two characters are treated as individual features as well. This approach significantly reduces out-of-vocabulary words. This is especially true for languages like Arabic, which have large alphabets.

In another implementation, a bag-of-code-points model is used as a pre-filter before language detection. It works similarly to the bag-of-words model discussed above, but likelihoods are accumulated on the basis of code points instead of words. The bag-of-code-points model provides a preliminary filtering of languages before the primary language detection is performed. It identifies the text as being from a particular subset of languages and updates the list of languages for the language detection routine to use to restrain the set of languages it considers. If ASCII code points are to be excluded, only code points that are greater than 127 are used in calculating the likelihoods.

All probabilities can be stored and manipulated in the logarithmic domain rather than the linear domain. The log-based approach enables calculation of accumulated probabilities by adding rather than by multiplying. In addition, if the probabilities of hundreds of terms were multiplied together in the linear domain, the resulting score could be too small to represent using float or double data types, and thus mistakenly be transformed into 0.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving a sequence of bytes representing text in a document;
identifying a plurality of byte-n-grams occurring in the sequence of bytes, each byte-n-gram comprising n adjacent bytes from the sequence of bytes, where n is an integer greater than 1;
identifying, for multiple encodings, a respective likelihood of each byte-n-gram occurring in each of the respective multiple encodings;
receiving multiple likelihoods associated with a top-level-domain of the document, each of the multiple likelihoods indicating a likelihood that documents from the top level domain are in a respective one of the multiple encodings;
determining a respective encoding score for each of the multiple encodings, each respective encoding score being based on the likelihood of the plurality of byte-n-grams occurring in the corresponding one of the multiple encodings and based on the likelihoods associated with the top-level-domain the corresponding one of the multiple encodings; and
identifying a most likely encoding of the document based on a highest encoding score among the encoding scores.

2. The method of claim 1, where n is two.

3. The method of claim 1, further comprising:
removing from the plurality of byte-n-grams every byte-n-gram in which all bytes have a value less than 127.

4. The method of claim 1, further comprising:
identifying a language based on the most likely encoding of the document.

5. The method of claim 1, further comprising:
identifying a plurality of words represented in the sequence of bytes representing text in the document;
determining a language score for each of multiple languages based on a respective per-word likelihood that each word occurs in each of the multiple languages; and
identifying a most likely language of the document based on a highest language score among the language scores for the multiple languages.

6. A computer program product, encoded on a non-transitory computer-readable medium, operable to cause data processing apparatus to:
receive a sequence of bytes representing text in a document;
identify a plurality of byte-n-grams occurring in the sequence of bytes, each byte-n-gram comprising n adjacent bytes from the sequence of bytes, where n is an integer greater than 1;
identify, for multiple encodings, a respective likelihood of each byte-n-gram occurring in each of the respective multiple encodings;
receive multiple likelihoods associated with a top-level-domain of the document, each of the multiple likelihoods indicating a likelihood that documents from the top level domain are in a respective one of the multiple encodings;
determine a respective encoding score for each of the multiple encodings, each respective encoding score being based on the likelihood of the plurality of byte-n-grams occurring in the corresponding one of the multiple encodings and based on the likelihoods associated with the top-level-domain the corresponding one of the multiple encodings; and
identify a most likely encoding of the document based on a highest encoding score among the encoding scores.

7. The program product of claim 6, where n is two.

8. The program product of claim 6, being further operable to:

remove from the plurality of byte-n-grams every byte-n-gram in which all bytes have a value less than 127.

9. The program product of claim 6, being further operable to:
- identify a language based on the most likely encoding of the document.

10. The program product of claim 6, being further operable to:
- identify a plurality of words represented in the sequence of bytes representing text in the document;
- determine a language score for each of multiple languages based on a respective per-word likelihood that each word occurs in each of the multiple languages; and
- identify a most likely language of the document based on a highest language score among the language scores for the multiple languages.

11. A system comprising:
- means for receiving a sequence of bytes representing text in a document;
- means for identifying a plurality of byte-n-grams occurring in the sequence of bytes, each byte-n-gram comprising n adjacent bytes from the sequence of bytes, where n is an integer greater than 1;
- means for identifying, for multiple encodings, a respective likelihood of each byte-n-gram occurring in each of the respective multiple encodings;
- means for receiving multiple likelihoods associated with a top-level-domain of the document, each of the multiple likelihoods indicating a likelihood that documents from the top level domain are in a respective one of the multiple encodings;
- means for determining a respective encoding score for each of the multiple encodings, each respective encoding score being based on the likelihood of the plurality of byte-n-grams occurring in the corresponding one of the multiple encodings and based on the likelihoods associated with the top-level-domain the corresponding one of the multiple encodings; and
- means for identifying a most likely encoding of the document based on a highest encoding score among the encoding scores.

12. The system of claim 11, where n is two.

13. The system of claim 11, further comprising:
- means for removing from the plurality of byte-n-grams every byte-n-gram in which all bytes have a value less than 127.

14. The system of claim 11, further comprising:
- means for identifying a language based on the most likely encoding of the document.

15. The system of claim 11, further comprising:
- means for identifying a plurality of words represented in the sequence of bytes representing text in the document;
- means for determining a language score for each of multiple languages based on a respective per-word likelihood that each word occurs in each of the multiple languages; and
- means for identifying a most likely language of the document based on a highest language score among the language scores for the multiple languages.

* * * * *